US006506006B2

(12) United States Patent
Lui et al.

(10) Patent No.: US 6,506,006 B2
(45) Date of Patent: Jan. 14, 2003

(54) POWER HAND TOOL HAVING A DETACHABLE HANDLE

(75) Inventors: Tat Nin Lui, Aberdeen (HK); Ping Hay Heun, Aberdeen (HK)

(73) Assignee: Choon Nang Electrical Appliance, Aberdeen (HK)

( * ) Notice: Subject to any disclaimer, the term of this patent is extended or adjusted under 35 U.S.C. 154(b) by 54 days.

(21) Appl. No.: 09/801,863

(22) Filed: Mar. 8, 2001

(65) Prior Publication Data

US 2002/0131834 A1 Sep. 19, 2002

(51) Int. Cl.[7] .................................................. B23C 1/20

(52) U.S. Cl. ............... 409/182; 144/136.95; 144/154.5; 409/218

(58) Field of Search ................................ 409/175, 181, 409/182, 218; 408/124, 241 S; 16/422, 430; 144/136.95, 154.5

(56) References Cited

U.S. PATENT DOCUMENTS

| | | | | | |
|---|---|---|---|---|---|
| 2,933,021 A | * | 4/1960 | Kennedy et al. | ......... | 144/136.1 |
| 3,478,788 A | * | 11/1969 | Zelik | ....................... | 144/134.1 |
| 3,487,747 A | * | 1/1970 | Burrows et al. | ......... | 144/134.1 |
| 4,316,685 A | * | 2/1982 | George | .................. | 144/136.95 |
| 4,615,654 A | * | 10/1986 | Shaw | .................... | 144/136.95 |
| 4,993,897 A | * | 2/1991 | Anderhalden | .......... | 144/136.95 |
| 5,813,805 A | | 9/1998 | Kopras | ................... | 408/241 R |
| 5,829,931 A | * | 11/1998 | Doumani | ................. | 144/251.1 |
| 5,902,080 A | * | 5/1999 | Kopras | .................. | 144/136.95 |

* cited by examiner

*Primary Examiner*—Daniel W. Howell
(74) *Attorney, Agent, or Firm*—Leydig, Voit & Mayer, Ltd.

(57) ABSTRACT

A power hand tool includes a body, an electric motor, an output driving shaft rotatable by the motor, a holder for holding a cutting bit and rotatable by the shaft for, in turn, rotating the cutting bit for cutting, an electrical switch provided on the body for controlling operation of the motor, and a detachable handle. The handle has a first, fixed end releasably connected to the body, a middle section extending to form a relatively large gap with the body sufficiently wide to allow the handle to be gripped by a hand, and a second, free end. The free end extends to approach a region on the surface of the body adjacent and not reaching the switch and forms a relatively small gap with the region sufficiently narrow to retain a hand gripping the handle.

12 Claims, 2 Drawing Sheets

POWER HAND TOOL HAVING A DETACHABLE HANDLE

The present invention relates to a power hand tool having a detachable handle.

BACKGROUND OF THE INVENTION

Most power hand tools have a handle, and some of the handles are detachable, for example as disclosed in U.S. Pat. No. 5,813,805. The electrical switch for operating a power hand tool is usually located on the handle, as in the case disclosed in U.S. Pat. No. 5,813,805, such that the thumb or fingers of the hand gripping the handle can readily reach the switch for operating it. As exemplified in U.S. Pat. No. 5,813,805, the connection of the handle to the hand tool body and the provision of the switch are complicated.

The invention seeks to mitigate or at least alleviate such problems by providing a power hand tool having a detachable handle.

SUMMARY OF THE INVENTION

According to the invention, there is provided a power hand tool comprising a body, an internal electric motor, an output driving shaft rotatable by the motor, a holder for holding a cutting bit and rotatable by the shaft for, in turn, rotating a cutting bit for cutting, an electrical switch provided on the body for controlling the operation of the motor, and a detachable handle for the body. The handle has a first, fixed end releasably connected to the body, a middle section extending to form a relatively large gap with the body sufficiently wide to allow the handle to be gripped by a hand, and a second, free end. The free end extends to approach a region on the surface of the body adjacent and reaching short of the switch and forms a relatively small gap with the region sufficiently narrow to retain said hand gripping the handle.

Preferably, the second end of the handle extends towards the region in a curved manner.

Preferably, the second end of the handle, does not cover the switch or an operating member.

It is preferred that the gap has a width less than 10 mm, and more preferably less than 6 mm.

It is preferred that the first end of the handle is crooked.

In a preferred embodiment, the first end of the handle is connected to the body by means of an annular connector securable to the body.

More preferably, the connector comprises a collar for securing, around the body and a protrusion extending from one side of the ring to locate the first end of the handle.

Further more preferably, the first end of the handle has two parts, which are closable together to embrace the protrusion for connection therewith.

Further more preferably, the first end of the handle and the protrusion are both crooked and through substantially the same angle.

It is preferred that the connector include a part for locating a positioning ring for a cutting bit held by the holder to define a cutting plane.

The power hand tool may be a spiral cutting tool.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
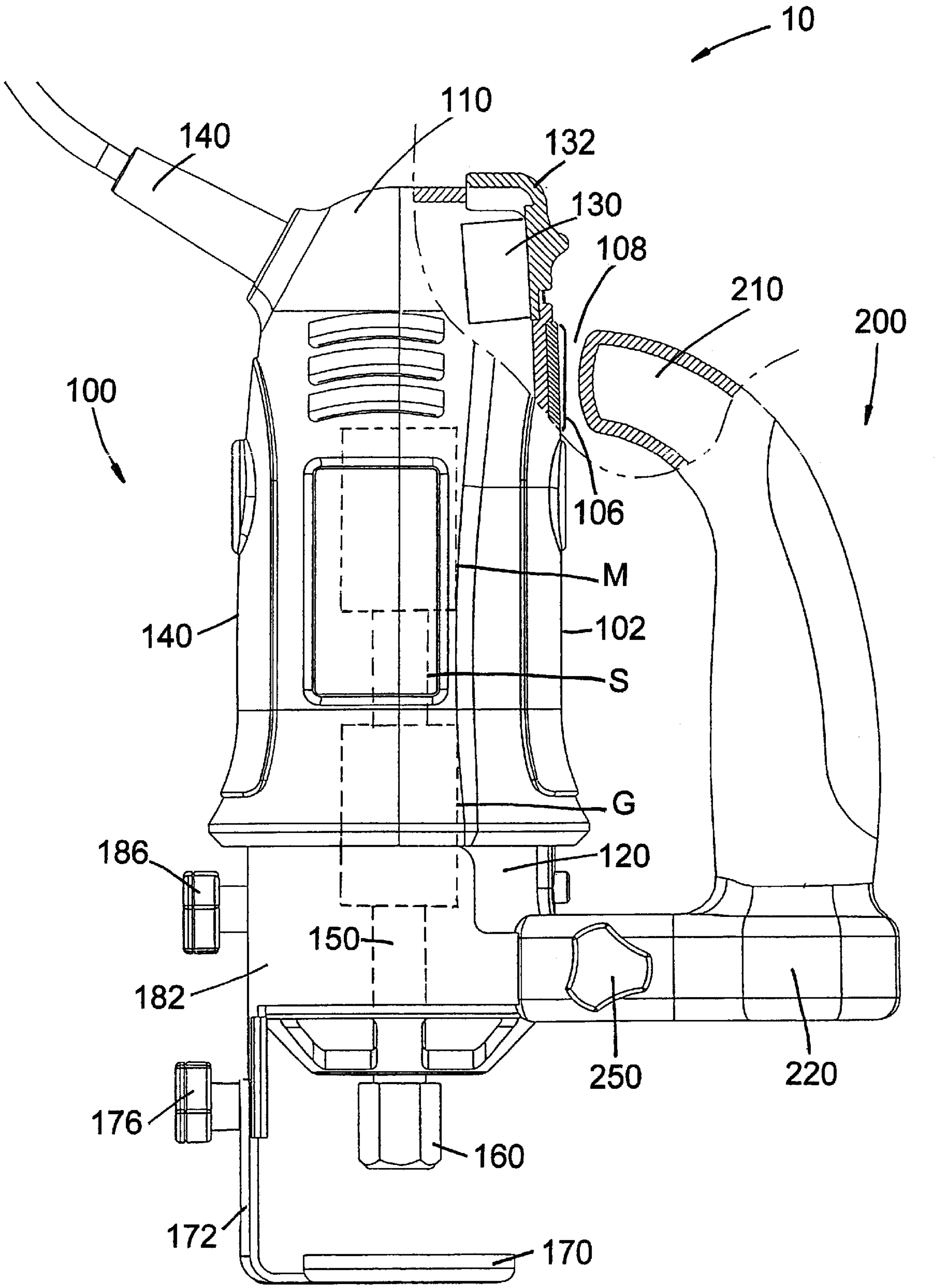
FIG. 1 is a side view of an embodiment of a power hand tool in accordance with the invention, the tool having a detachable handle.
Figure 2:
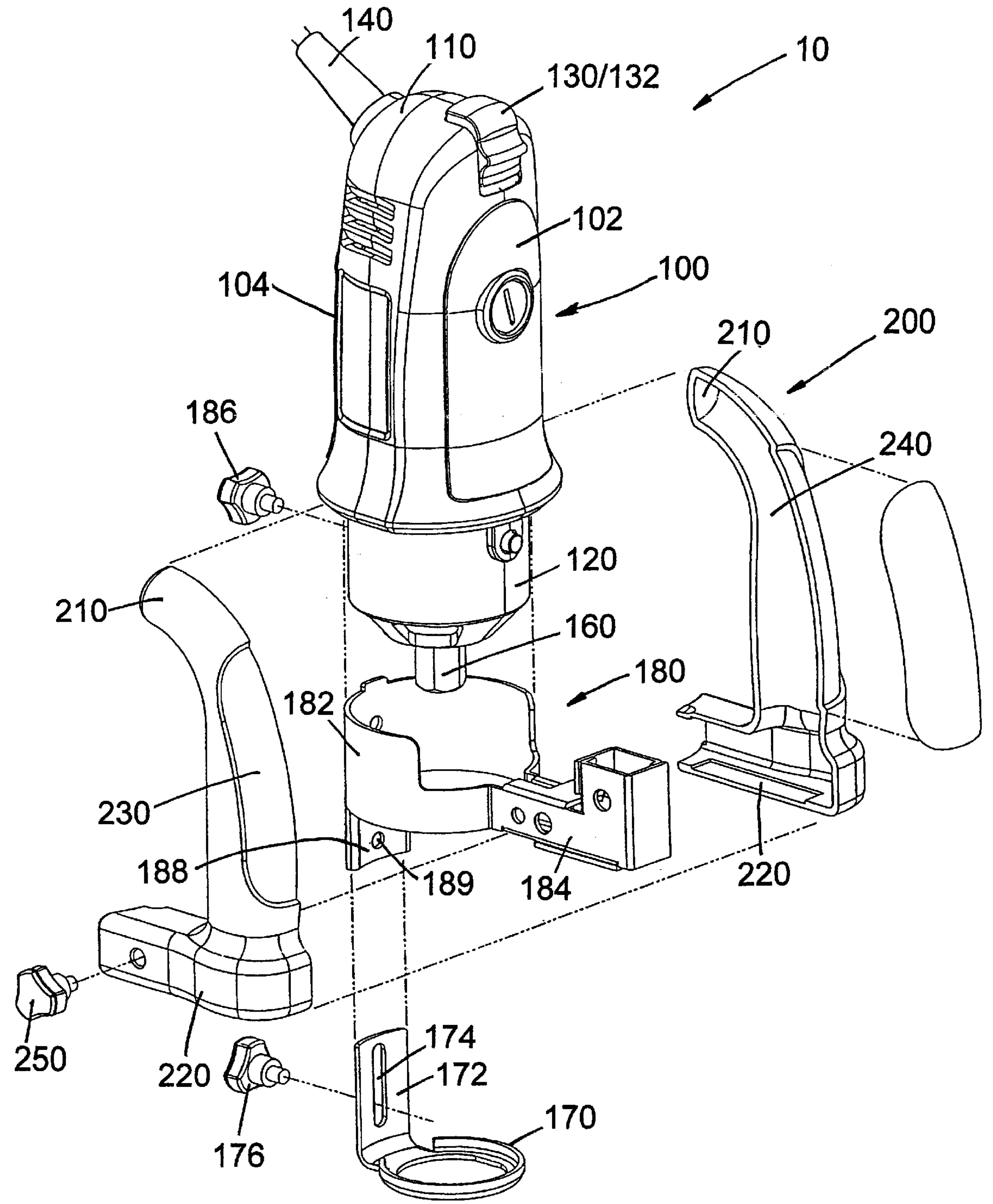
FIG. 2 is an exploded perspective view of the hand tool of FIG. 1, showing how the handle is connected.

Referring to the drawings, there is shown a power hand tool, in the form of a hand-held electric trimmer 10, embodying the invention, which has a generally cylindrical body 100. The trimmer 10 is a spiral cutting tool, in that cutting is performed by positioning the axis of the body 100 perpendicular to a workpiece surface and moving a cutting tool bit through the workpiece in a direction perpendicular to the axis of the cutting bit to remove material from the workpiece, particularly from an edge.

Apart from the body 100,which is shown in an upright position to have a vertical central axis, the trimmer 10 includes a vertical handle 200 detachably connected to a first side 102 of the body 100. The body 100 has upper and lower ends 110 and 120, at which upper end 110 an electrical switch 130 is located on the first side 102 and from, which a power cord 140 extends on the opposite, second side 104. The switch 130 has an operating knob 132 that is slidable (or depressible in a different embodiment) upwards to close the switch 130 and downwards to open the switch 130.

The trimmer 10 includes, internally of the body 110, an electric motor M having a shaft S, a speed-reduction gearbox G connected at one end to the motor shaft S, and an output driving shaft 150 connected to the opposite end of the gearbox G. The driving shaft 150 extends co-axially from the lower body end 120. The motor M is connected to the power cord 140 for supply of electrical power via the switch 130, which controls the operation of the motor M, such as switching it on and off. A cutting bit holder 160 is mounted co-axially on the outer end of the driving shaft 150 for holding a cutting bit (not shown) to the shaft 150 for rotation by the motor M via the gearbox G about the axis of the body 100. The cutting bit holder 160 is in the form of a collet or, alternatively, a chuck, as generally known in the art. It is understood that the gearbox G may not be employed, in which case the output driving shaft 150 is the motor shaft S.

The operation of the cutting bit normally requires the use of a horizontal positioning ring 170 which extends around the cutting bit and, in use, bears against the workpiece to define a lateral cutting plane for the cutting bit. The ring 170 has an upright integral side tab 172 including a co-extending slat 174. The ring 170 is connected to one side of the lower end 120 of the trimmer body 100 by a screw 176 passing through the slot 174, such that the ring 170 is generally concentric with the cutting bit and its vertical position is adjustable.

The handle 200 has upper and lower ends 210 and 220, and is formed by left and right hollow parts 230 and 240 which are attached together by two internal screws (not shown) at the lower end 220. The lower handle end 220 is crooked through an angle of about 90°, and the upper handle end 210 is smoothly curved to the same side. An external screw 250 is shown on the lower handle end 220.

A connector 180 is used to connect the lower end 220 of the handle 200 to the lower end 120 of the trimmer body 100. The connector 180 has a cylindrical collar 182 and a bracket 184 protruding radially from one side of the collar 182. The collar 182 has a break (or gap) at its junction with the bracket 184, whereby the collar 182 may be loosened for disposing over and around the lower body end 120 and subsequently tightened, both by means of the screw 250.

The bracket 184 is L-shaped (crooked through an angle of about 90°) and is slightly smaller than the interior of the lower handle end 220. The bracket 184 is designed to be embraced by and wholly within the left and right handle parts 230 and 240 at that end 220 when the handle parts 230 and 240 are closed together. The handle parts 230 and 240 are attached together by two internal screws at the lower end 220, as mentioned above. These screws are secured through the bracket 184 (via the two relatively larger holes as shown) such that the handle parts 230 and 240 and the bracket 184 are rigidly connected together, whereby the handle 200 and the connector 180 form a unitary device.

The screw 250 is inserted through the left handle part 230 into the bracket 184 and, more importantly, across the break (or gap) of the collar 182 for tightening or loosening the collar 182 on the lower body end 120. In order to positively fix the collar 182 on the body end 120, a screw 186 is used on the side of the collar 182 opposite the bracket 184.

The collar 182 has a depending tab 188 on the side opposite the bracket 184, for supporting the tab 172 of the positioning ring 170. The tab 188 includes a screw-threaded hole 189 for the screw 176. The screw 176 passes through the slot 174 of the tab 172 and attaches the ring 170 to the collar 182 or the connector 180 at an adjustable position.

The handle 200 and connector 180 may be removed by loosening the screws 250 and 186. Without the handle 200 and connector 180, the trimmer 10 remains usable as a conventional trimmer 10 to be gripped by the body 100. In this case, the positioning ring 170, having a lengthened tab 172, if necessary, should be connected directly to the lower body end 120 by the screw 176 or 186.

When the handle 200 is attached on the trimmer body 100, its lower end 220 is fixably connected, and its upper end 210 is an unconnected free end extending to approach or point at a region 106 on the surface of the first side 102 of the body 100 adjacent the switch 130. The region 106 reaches short of and is directly be low (as shown) the switch 130, with which region 106 the extremity of the upper handle end 210 forms a relatively small gap 108. The gap 108 has a width less than 6 mm and preferably a maximum width of 5 mm.

As shown and inferred from the foregoing, the handle 200 has a middle section between the two ends 210 and 220, which extends to form a relatively larger gap with the first side 102 of the trimmer body 100 that is sufficiently wide to allow the handle 200 to be gripped by a hand of a user.

The smaller gap 108 is present to simplify the connection of the handle 200 to the body 100, by avoiding double connections at opposite ends 210 and 220. The width of the gap 108, is determined to be less than 6 mm which is sufficiently narrow to retain the palm and/or fingers of the hand gripping the handle 200. The upper handle end 210 associated with this gap 108 extends to reach as close as possible to the switch 130, and yet without obstructing its operation by leaving the switch knob 132 on the outside uncovered. As a result, the thumb or index finger of the hand gripping the handle 200 can easily and conveniently get to the knob 132, and operate the switch 130.

The invention has been given by way of example only, and various modifications of and/or alterations to the described embodiment may be made by persons skilled in the art without departing from the scope of the invention as specified in the appended claims.

What is claimed is:

1. A power hand tool comprising:

a body, an internal electric motor, an output driving shaft rotatable by the motor, a holder for holding a cutting bit and rotatable by the shaft for, in turn, rotating a cutting bit for cutting, an electrical switch on the body for controlling operation of the motor, and a detachable handle for the body, the handle having
- a first, fixed end releasably connected to the body,
- a middle section extending to form a first gap with the body sufficiently wide to allow the handle to be gripped by a hand, and
- a second, free end which extends to approach a region on the surface of the body adjacent and not reaching the switch and forms a second gap with the region sufficiently narrow to retain a hand gripping the handle.

2. The power hand tool as claimed in claim 1, wherein the second end of the handle curves towards the region.

3. The power hand tool as claimed in claim 1, wherein the second end of the handle does not cover the switch.

4. The power hand tool as claimed in claim 1, wherein the second gap has a width less than 10 mm.

5. The power hand tool as claimed in claim 4, wherein the second gap has a width less than 6 mm.

6. The power hand tool as claimed in claim 1, wherein the first end of the handle is crooked.

7. The power hand tool as claimed in claim 1, including an annular connector connecting the first end of the handle to the body and securable to the body.

8. The power hand tool as claimed in claim 7, wherein the connector comprises a collar for securing around the body and a protrusion extending from one side of the collar to locate the first end of the handle.

9. The power hand tool as claimed in claim 8, wherein the first end of the handle has two parts which are closable together to embrace the protrusion.

10. The power hand tool as claimed in claim 9, wherein the first end of the handle and the protrusion are both crooked and bent through substantially the same angle.

11. The power hand tool as claimed in claim 7, wherein the connector includes a part for locating a positioning ring for a cutting bit held by the holder to define a cutting plane.

12. The power hand tool as claimed in claim 1, wherein the hand tool is a spiral cutting tool.

* * * * *